United States Patent
Piirainen et al.

(10) Patent No.: US 6,631,160 B2
(45) Date of Patent: Oct. 7, 2003

(54) METHOD FOR IMPROVED CHANNEL IMPULSE RESPONSE ESTIMATION IN TDMA SYSTEMS

(75) Inventors: Olli Piirainen, Oulu (FI); Aki Happonen, Kiiminki (FI)

(73) Assignee: Nokia Corporation, Espoo (FI)

( * ) Notice: Subject to any disclaimer, the term of this patent is extended or adjusted under 35 U.S.C. 154(b) by 234 days.

(21) Appl. No.: 09/848,751

(22) Filed: May 1, 2001

(65) Prior Publication Data

US 2002/0024994 A1 Feb. 28, 2002

Related U.S. Application Data

(63) Continuation of application No. PCT/EP98/07393, filed on Nov. 18, 1998.

(51) Int. Cl.[7] ............................. H03H 7/30; H04B 1/10
(52) U.S. Cl. ........................................ 375/231; 375/350
(58) Field of Search ................................... 375/229, 230, 375/231, 232, 316, 350; 708/300, 322, 323

(56) References Cited

U.S. PATENT DOCUMENTS

| | | | |
|---|---|---|---|
| 5,251,233 A | 10/1993 | Labedz et al. | |
| 5,379,324 A | 1/1995 | Mueller et al. | |
| 6,373,888 B1 * | 4/2002 | Lindoff | 375/231 |
| 6,418,175 B1 * | 7/2002 | Pukkila et al. | 375/347 |

FOREIGN PATENT DOCUMENTS

| | | |
|---|---|---|
| EP | 0701334 A2 | 3/1996 |
| WO | WO 00/05847 | 2/2000 |

OTHER PUBLICATIONS

Giuseppe Caire and Urbashi Mitra; "Training Sequence Design for Adaptive Equalization of Multi–user Systems", Conference Record of 32nd Asilomar Conference on Signals, Systems and Computers, Nov. 1–4, 1998, vol. 2, XP–002112369, pp. 1479–1483.

Ian Opperman and Matti Latva–aho; "Efficient Packetised CDMA System for a High Mobility Urban Enviroment", VTC 1998, 48th IEEE Vehicular Technology Conference, Pathway To A Global Wireless Revolution, Ottawa, Ontario, May 18–21 1998, vol. 3, XP002112370, pp. 2192–2196.

International Search Report for PCT/EP98/07393.

* cited by examiner

Primary Examiner—Betsy L. Deppe
(74) Attorney, Agent, or Firm—Squire, Sanders & Dempsey L.L.P.

(57) ABSTRACT

The present invention proposes a signal processing device for processing received signals having been transmitted via a transmission channel, wherein said received signals (y) are supplied to an estimation means (2) adapted to estimated a channel impulse response function (h) of said transmission channel (1), with said estimation means being adapted to perform a Linear-Minimum-Mean-Square-Error-(LMMSE-) processing based on a training sequence (TR_SEQ) transmitted together with received samples contained in said received signals (y), and a noise and interference energy estimate represented by a noise and interference variance ($\delta^2$) as well as an impulse response energy distribution estimate represented by an estimated parameter covariance matrix ($C_{hh}$) for said channel (1). The present invention also proposes a corresponding method for signal processing.

14 Claims, 7 Drawing Sheets

METHOD FOR IMPROVED CHANNEL IMPULSE RESPONSE ESTIMATION IN TDMA SYSTEMS

This is a continuation of PCT/EP98/07393, filed Nov. 18, 1998.

FIELD OF THE INVENTION

The present invention relates to a method for processing received signals having been transmitted via a transmission channel and also relates to a corresponding device. In particular, the present invention is directed to a method and corresponding device for an improved estimation of the channel impulse response in TDMA systems.

BACKGROUND OF THE INVENTION

Recently, mobile radio telecommunication systems have widely spread. Such mobile radio telecommunication systems operate for example according to a commonly agreed standard, like for example the GSM standard. According to GSM standard, data transmission is performed according to a method of time divisional multiple access (TDMA). The TDMA transmission principle specifies that data are transmitted from a transmitter to a receiver and vice versa only during respectively specified time slots of frames.

Data transmission in such telecommunication systems substantially relies on digital data transmission. However, between a mobile radio transceiver device as a subscriber terminal (hereinafter: mobile station MS) and a stationary radio transceiver device as a serving radio network element (hereinafter: base station BS) data have necessarily to be transmitted as analogue data via the air interface Um.

Consequently, data transmitted by the mobile station MS are received via a base station antenna means of a reception device of the base station BS as analogue data. In the course of the further processing of the thus received data by the reception device, the analogue data are analog to digital converted, i.e. passed through an A/D converter means. At the next stage of the processing, the obtained digital data are supplied to an equalizer means for being equalized. The thus obtained output data are then supplied to a channel codec means for coding/decoding the data. At the reception side, decoding is performed to separate received speech data from associated signaling data.

Particular attention in the course of this processing has to be paid to the equalizing of the received data, since the equalizing is required to reconstruct, at the reception side, the transmitted signal from a mixture of received signals.

For example, assuming a situation in a radio telecommunication network with a base station BS and only a single mobile station MS present in the radio coverage area of the base station. Then, a signal s transmitted from the mobile station MS may reach the base station BS directly via line of sight at a time s(t). However, the same signal s may be deflected by, e.g., a building, a mountain or the like present in the environment. Thus, the same signal may reach the base station BS at a later point of time s(t+T), and is thus superposed to the signal s(t). Due to the delay T, both received signals are no longer in phase with each other. Moreover, the delayed signal s(t+T) may even be more attenuated than the signal s(t) due to the longer transmission path. Thus, the signal received by the base station BS and originating from the mobile station MS is distorted. Now, assuming that another mobile station MS' is additionally present, then signals s'(t'), s'(t'+T') are additionally received by the base station BS, which may lead to interference between the respective transmitted data symbols (intersymbol interference).

Therefore, an equalizer means has to reconstruct (detect) the initially transmitted signal s(t) and/or s'(t') from the received mixture of signals s(t), s(t+T), s'(t'), s'(t'+T').

The thus reconstructed (or detected) signal is required to be as similar to the originally transmitted signal as possible. This reconstruction is therefore a main concern when designing equalizers, e.g. for use in a reception device of a base station BS.

Hitherto, in equalizers of reception devices used in mobile telecommunication systems, the channel impulse response (CIR) is estimated, and the thus estimated channel impulse response is used to detect, i.e. to reconstruct the transmitted data symbols.

The estimated channel impulse response is usually based on the received samples of the stream of data symbols. Therefore, it is an estimate of the actual (observed) channel impulse response. However, an error in the channel impulse response leads to a degraded performance when detecting/reconstructing transmitted data symbols from received data symbols.

In a previous solution, the above described estimated channel impulse response is assumed to be ideal, thereby disregarding errors, and it is used as it is for data symbol reconstruction. However, this solution was unsatisfactory due to the error in the observed channel impulse response being not taken into account.

Another known solution for improving the performance of an equalizer is disclosed in document U.S. Pat. No. 5,251,233 by Labedz et. al., assigned to Motorola Inc. The basic idea described therein is to estimate the energy of taps in the impulse response. Those taps having an energy below a predetermined threshold level are zeroed in order to reduce noise in the estimated channel impulse response. This previously proposed method may be applied to complex taps or real taps, i.e. may be performed separately for real and imaginary taps. The method disclosed in the Labedz patent improves (i.e. reduces) the bit error rate BER in the reproduced detected signal (which is an indication for the quality of a receiver) in situations where the channel interference ratio C/I or C/(I+N), respectively, with N being a noise signal superposed to an interfering signal, is low and the channel has a poor quality. The method is also beneficial in channels having a short impulse response. (The term taps refers to coefficients of each respective delay element of the corresponding FIR model for the used circuitry. Thus, based on the tap values, poles and zeroes of the transmission function may be calculated.)

However, under good channel conditions, the method as proposed by Labedz et. al. even degrades the receiver performance which may be attributable to the zeroing of amplitude coefficients of certain taps.

Additionally, document EP-A-0 701 334 A2 proposes a method and device to measure an impulse response of a radio channel which are respectively based on a correlation method which is performed twice.

However, using such a method, the estimation of the channel impulse response function to be used in an equalizer is somewhat delayed due to the double estimation cycle being performed.

Another approach has been conceived by NORTEL. This approach uses channel impulse response estimation methods which are based on least square error (LSE) methods.

U.S. Pat. No. 5,379,324 teaches to calculate noise variance in order to create more accurately an information signal.

The publication "Training Sequence Design for Adaptive Equalization of Multi-User Systems" by G. Caure, U. Mitra, in CONFERENCE RECORD OF THE THIRTY-SECOND ASILOMAR CONFERENCE ON SIGANLS, SYSTEMS AND COMPUTERS, November 1–4, 1998, Vol. 2, pages 1479–1483, XP002112369 1998, Piscateway, N.J., USA, IEEE, discloses the features of the preamble of the present independent claims 1 and 8, respectively.

SUMMARY OF THE INVENTION

Consequently, it is an object of the present invention to provide a method and device for processing received signals having been transmitted via a transmission channel which are free from the above drawbacks and which are particularly suitable for quickly estimating a most reliable channel impulse response function.

According to the present invention, this object is achieved by a method for processing received signals having been transmitted via a transmission channel as defined in claim 1.

Still further, according to the present invention, this object is achieved by a signal processing device for processing received signals having been transmitted via a transmission channel as defined in claim 8.

Advantageous further developments are as set out in the respective additional dependent claims.

According to the present invention, it can be dispensed with modifying an estimated channel impulse response function as it is the case in some of the above mentioned previous solutions.

According to the proposed invention the channel parameters and transmitted data and/or symbols and other quantities derived therefrom is in matrix representation. Normally, a processing of such matrixes increases the complexity of the processing when estimating the channel impulse response parameters. However, according to the proposed solution the matrix representation could be reduced to diagonal matrixes (having values differing from zero only in their diagonal), so that the processing load could be kept small, thereby resulting in a fast estimation process for the channel impulse response function. According to the inventors experiences in connection with applying the invention in a system operated according to GSM, for implementing the invention only a 7×7 matrix representation of the respective quantities is required. Nevertheless, in a preferred realization, in which also a time of arrival information (TOA) of respective signals is obtained in a pre-processing based on an obtained preliminary channel impulse response function, the matrix representation may even be reduced to a 5×5 matrix size.

The present invention has been found to be implementable in all channels as specified by the GSM 5.05 recommendation. The receiver performance could be improved in all such channels. Moreover, the improvement of received performance was observed in all channel interference situations, i.e. under various C/(I+N) conditions. In particular, the observed bit error rate (BER) as a measure for the receiver quality could be reduced by at least 15% as compared to a case in which the present invention has not been implemented.

Moreover, the present invention may easily be applied to and combined with other concepts for channel impulse response improvements, as for example those concepts described in the international patent application no. PCT/EP98/04562 of the same applicant (not yet published).

Preferred embodiments of the present invention are described herein below in detail with reference to the accompanying drawings.

DESCRIPTION OF PREFERRED EMBODIMENTS

Figure 1:
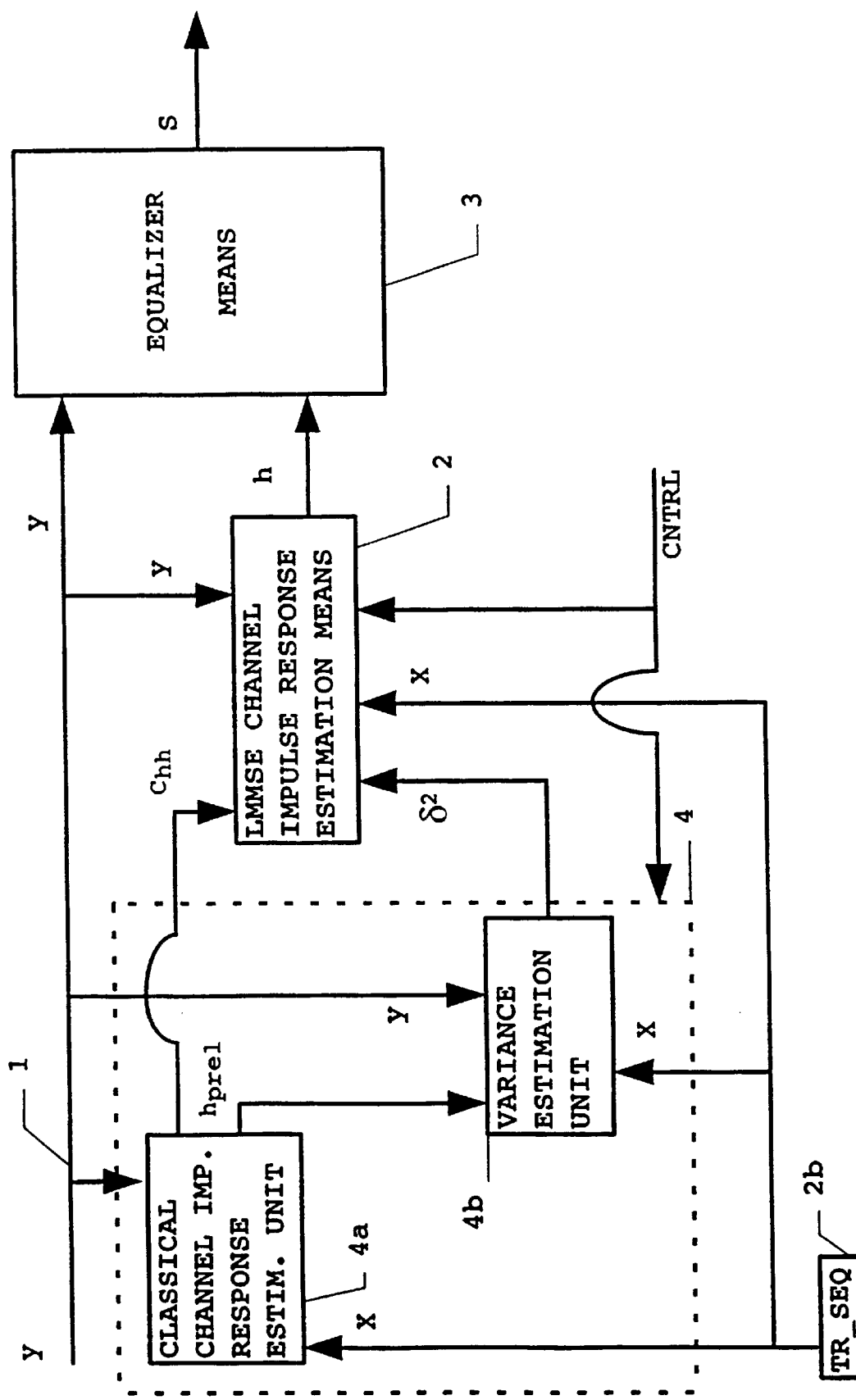
FIG. 1 shows a basic block circuit diagram of a device according to a first embodiment of the present invention.

Preferred embodiments of as well as the basic principle underlying the present invention are now described in detail with reference to the drawings.

The present invention starts from a point that "classical" estimation means (based for example on least square error (LSE-) methods or correlation methods) are no longer used for directly estimating the channel impulse response function to be used in an equalizer means.

Instead, the present invention proposes to adopt estimation means which are adapted to operate on the basis of Bayes' Theorem (so-called "Bayesian estimation means") or on the basis of a linear minimum mean square error (LMMSE-) processing (hereinafter referred to as "LMMSE-estimation means").

Subsequently, the invention is described with reference to an estimation means and/or method based on LMMSE processing.

In the following equations, capital bold letters denote matrixes, small bold letters denote vectors, and letters not printed in bold letters represent scalar operators.

In case a linear model for the transmission channel is assumed, received signals y having been transmitted via a transmission channel can be represented by $$y = Xh + w \tag{1}$$

with y representing received signals, X representing a symbol sequence matrix, h representing the channel impulse response (to be obtained by estimation), and w representing the noise (or interference) vector.

The symbol sequence matrix X is defined according to a known training sequence TR_SEQ. The training sequence is known beforehand to the system and is also transmitted as part of the data transmitted on the transmission channel during a time slot TS of a TDMA frame as a so-called burst.

Based on such a channel model and using a LMMSE-processing, the parameters $h_i$ of the vector h can be obtained based on the following basic equation:

$$h = E(h) + (C_{hh}^{-1} + X^H C_w^{-1} X) X^H C_w^{-1} (y - XE(h)) \tag{2}$$

with $C_w$ representing the covariance matrix of noise, $C_{hh}$ representing the covariance matrix of the estimated channel impulse response function parameters, and E representing the phase matrix including information of the signal phase relation of the received signals, which have undergone a multi-path transmission due to reflection phenomena as explained before. The operator "$^{-1}$" denotes a respective inverse matrix (such that for a matrix M a relation M*M$^{-1}$= E is satisfied, with E representing the unit matrix), and the operator "$^H$" denotes the complex conjugate transposition of the respective matrix and/or vector.

Apparently, the term on the right side of equation (2) is dependent on the term on the left side of the equation, i.e. the result intended to be obtained. Moreover, the covariance matrix of noise $C_w$ as well as the covariance matrix of the channel impulse response function $C_{hh}$ are unknown.

Therefore, it has hitherto been impossible to implement a channel impulse response function estimation method and/ or estimation means based on such a LMMSE processing.

However, as a result of their studies, the present inventors have found out that this concept can be simplified in a way to be usable for practical implementations.

Namely, an LMMSE processing for channel impulse response function estimation can be used after some a priori estimations are made.

First Assumption

The phase of the respectively received signal is unknown and the value expected for the phase comes close to zero or approaches zero.

Hence, it may safely be assumed that E(h)=0.

Second Assumption

Assuming that, in the concerned context, an occurring noise signal component is white noise, the covariance matrix of noise $C_w$ can be written as follows:

$$C_W = \begin{pmatrix} \delta^2 & 0 & \ldots & 0 \\ 0 & \delta^2 & \ldots & 0 \\ \ldots & \ldots & \ldots & \ldots \\ 0 & 0 & 0 & \delta^2 \end{pmatrix} \quad (3)$$

where $\delta^2$ is the noise variance of the linear model initially assumed (starting point linear model) of the channel. The variance is closely related to the estimated energy of the interference and the energy of noise, and depends on instantaneous amount of interference on the channel, which interference itself depends on the amount of telecommunication traffic on the channel at the particular moment.

Third Assumption

As is known, the received signal is a mixture of signal components as a result of the assumed multi-path channel. Each received component has a certain amplitude and is received with a specific delay (respectively dependent on the transmission path of the multi-path channel). Each signal having as its characteristics an amplitude and a certain delay may thus be assumed to represent a so-called "tap" in an amplitude-delay-diagram for the multi-path channel. However, those separate channel impulse response taps are uncorrelated, i.e. independent from each other. Consequently, the covariance matrix of the channel impulse response function $C_{hh}$ can be reduced to a diagonal matrix in which only those matrix elements assume a value different from zero, which are on the diagonal of the matrix. Namely, the covariance matrix of the channel impulse response function $C_{hh}$ can be written as follows:

$$C_{hh} = \begin{pmatrix} h_0 * h_0 & 0 & \ldots & 0 \\ 0 & h_1 * h_1 & \ldots & 0 \\ \ldots & \ldots & \ldots & \ldots \\ 0 & 0 & 0 & h_i * h_i \end{pmatrix} \quad (4)$$

It is to be noted that the matrix elements are in complex notation and that the operator "*" denotes a respective conjugate complex value. Thus, each product $h_i * h_i$ represents the absolute value or amount, respectively, $|h_i|^2$ of the complex channel impulse response parameter of an i-th component of the multi-path channel model, which can thus be derived from the amplitude of a corresponding "tap" representing a respective portion of the multi-path transmission. Stated in other words, the respective elements of the matrix $C_{hh}$ are representative of a respective estimated channel impulse response energy (impulse response tap energy).

Using these three assumptions and substituting in equation (2), equation (2) can be reduced to the following format:

$$h = (\delta^2 C_{hh}^{-1} + X^H X)^{-1} X^H y, \quad (5)$$

wherein h denotes the channel impulse response function in vector representation, $\delta^2$ denotes the value of the variance of the noise of the starting point linear model, $C_{hh}$ is the estimated parameter covariance matrix, X is the symbol sequence matrix containing information regarding a used training sequence TR_SEQ, y denotes the received signal in vector representation, and the operator "$^{-1}$" denotes a respective inverse matrix (such that for a matrix M a relation M*M$^{-1}$=E is satisfied, with E representing the unit matrix), and the operator "$^H$" denotes the complex conjugate transposition of the respective matrix and/or vector. It is to be noted that $C_{hh}^{-1}$ here takes a form of $$C_{hh}^{-1} = \begin{pmatrix} 1/(h_0 * h_0) & 0 & \ldots & 0 \\ 0 & 1/(h_1 * h_1) & \ldots & 0 \\ \ldots & \ldots & \ldots & \ldots \\ 0 & 0 & 0 & 1/(h_i * h_i) \end{pmatrix} \quad (6)$$

(Assuming that $\delta^2 \rightarrow 0$, the proposed method/device will perform a processing according to a classical LSE method (least square error), while if auto-correlation properties of a chosen training sequence TR_SEQ are suitably selected, the processing corresponds to a basic correlation processing.)

In equation (5) only two unknown parameters are required for carrying out the present invention: $\delta^2$ and $C_{hh}$ or $C_{hh}^{-1}$, respectively.

These necessary information can be provided according to different possibilities. Three of these possibilities are described hereinafter as examples.

According to a first and second approach, the required unknown parameters are determined as a result of a respective pre-processing of received signals y.

This provides high flexibility, since a mobile station MS receiver device can be operated under different channel conditions and types (e.g. RA, HT, TU) dependent on where a subscriber presently uses its terminal. So, this first and second approach is applicable to reception devices in both, base stations BS as well as mobile stations MS.

In the course of the pre-processing according to the first approach, a preliminary impulse response $h_{prel}$ is obtained by estimation using a classical approach (e.g. based on LSE or correlation methods). Based on this preliminarily obtained channel impulse response function $h_{prel}$, the estimated variance $\delta^2$ is derived. The signal variance $\delta^2$ can be estimated based on calculation of an expected value of the residual energy E as follows $\delta^2$=Energy($|y-Xh|^2$). The obtained variance information is then used for the LMMSE channel impulse response function estimation described above.

Additionally, the elements of the parameter covariance matrix $C_{hh}$ can be derived from the preliminarily obtained channel impulse response function $h_{prel}$ according to equation (6) and can then be used for the subsequent LMMSE estimation process.

Alternatively, according to the second approach, the $C_{hh}$ covariance matrix can be estimated in the pre-processing using so-called history information of the channel impulse response function, i.e. information including at least one or several recent channel impulse response parameters. The signal variance, however, is related to the currently received burst, and as it may vary significantly from burst to burst (due to fading channels) no history information can be used for deriving this information.

For example, such history information could be represented by an average value of a certain number of previously obtained channel impulse response parameters, such that temporarily occurring strong variations in channel conditions have less influence on the estimated channel impulse response function h as such. Also, in connection with deriving the $C_{hh}$ matrix elements based on history information of a preliminary channel impulse response $h_{prel'}$, a LMS (least mean square) algorithm is conceivable to be used.

In a particular suitable manner, the pre-processing according to the second approach may be performed utilizing a method/device as described in same applicants and same inventors' international patent application titled "A method for modifying the channel impulse response in TDMA systems" filed simultaneously with the present application. This application proposes a method and/or device for modifying an estimated channel impulse response function taking account of the history of the channel impulse response function, as will be detailed further below in connection with the description of FIGS. 2A to 2D.

Thus, in connection with the above outlined first and second approaches, the required parameters are obtained based on a respective currently established channel 1 on which data signals are being transmitted (i.e. parameters are estimated from the currently received burst), and subsequently used in the LMMSE estimation process and the accordingly adapted device.

Furthermore, in connection with the above first and second approaches, based on the parameters of the preliminary channel impulse response function $h_{prel}$ or $h_{prel'}$, information of the time of arrival TOA can be obtained. This means, that up to a certain extent it can be predicted when specific signal components of the multi-path components, preferably the strongest ones, will be received. On the basis of this information, the required processing load can be reduced due to a reduced matrix size, i.e. a channel can be modeled such that fewer multi-path components have to be considered, since only those multi-path components within a time window around the estimated time of arrival need to be considered.

To explain this in greater detail, the following example case is considered. The preliminary channel impulse response estimate resulting from pre-processing is estimated (calculated) for each burst separately (without history information as a default, but using history information is also possible). It is assumed in the present example, that the length of the channel impulse response vector is seven, and using this preliminary impulse response estimate, the timing of arrival (TOA) of a received burst can be estimated by selecting a window comprising those five impulse response component values (also referred to as symbols and/or taps) having most energy. Estimation of the channel impulse response energy can be based on the following processing:

$$\text{Energy}(j) = \sum_{i=0+j}^{4+j} |\text{Re}\{hj\} + \text{Im}\{hj\}|^2 \qquad (7)$$

The index j is changed from zero to two, thus yielding three values for Energy(j). The impulse response (and TOA) is selected according to the maximum of these energy values and according to this selection, five taps of the preliminary channel impulse response values are selected to be subjected-again to an estimation using the proposed subsequent LMMSE estimation. (Stated in other words, seven taps are (preliminarily) calculated to find the five taps (for being processed further) having the maximum energy of the seven taps, and the TOA corresponds to the "place" at which the window was best.)

According to a third approach, the $C_{hh}$ parameters are adaptively and/or iteratively obtained based on history information from previous bursts. This means, that the channel impulse response h obtained from LMMSE processing may be evaluated using an adaptive processing (based on, for example, LMS processing) which derives the $C_{hh}$ parameters based on the previously obtained channel impulse response and uses the thus adaptively obtained parameters for subsequent cycles of LMMSE processing. The variance $\delta^2$, according to the third approach, is estimated substantially similar as in the first/second approach. This means, that the variance $\delta^2$ is derived based on the data samples y of the currently received burst, the symbols sequence matrix X, and the (preliminary) estimated channel impulse h (which, according to the third approach) is the channel impulse obtained from LMMSE processing.

The present invention will now be described with reference to specific embodiments of accordingly adapted devices.

FIG. 1 is a block diagram depicting a signal processing device for processing received signals y having been transmitted via a transmission channel 1, according to a first embodiment of the present invention (according to the above mentioned first approach).

The signals y are supplied to a channel impulse response estimation means 2 which is adapted to carry out an LMMSE processing. Preferably, the operation of the channel impulse response estimation means 2 is expressed by the above mentioned equation (5). An output h of the channel impulse response estimation means 2 is supplied as a control signal to an equalizer means 3, which equalizes the supplied signals y to derive a signal s representing the signal which has originally been transmitted via the channel 1.

The known training sequence TR_SEQ is for example available for the estimation means upon reading the training sequence TR_SEQ from a memory means 2b which may be implemented as a read only memory ROM in form of a look up table LUT. Such a look up table may contain one or more training sequences. (Each respective training sequence being particularly applicable in a certain environment or channel condition). Based on the thus pre-stored training sequence, the symbol sequence matrix X can be obtained and supplied to the LMMSE estimation means 2. It has to be noted that FIG. 1 illustrates a situation, in which not the particular training sequences are pre-stored, but in which already the symbol sequence matrixes X are stored in the memory or look up table 2b.

The other necessary parameters, namely the values of the components of the $C_{hh}$ matrix and the value of the variance of the noise $\delta^2$ are supplied to the LMMSE channel impulse response estimation means 2 from a pre-processing means 4 (described herein below).

The LMMSE channel impulse response estimation means 2 is controlled by a control means (not shown) which applies a control signal CNTRL to the channel impulse response estimation means 2. The control is in particular effected such that the estimation is performed only during those periods of time, in which the received signals y contain a training sequence TR_SEQ which is known to the system. Moreover, estimation of variance is effected on a per burst basis, i.e. separately for each burst, since it can vary very fast from burst to burst.

Nevertheless, although only one control signal line is depicted for the purpose of simplification of the drawing representation, more than one control signal may be applied, thereby also suitably controlling the reading operation from the look up table 2b.

Now, the pre-processing means 4 is described, to which the received signals y are also supplied. In detail, the control means (not shown) control the pre-processing means 4 and the LMMSE estimation means 2 in terms of the timing and all other operations.

Moreover, the received signals y and the training sequence TR_SEQ (or the-corresponding symbol sequence matrix X) are also supplied to the pre-processing means 4. The pre-processing means 4 illustrated as an example consists of two units.

A first unit thereof is a first estimation unit 4a as a classical channel impulse response estimation unit for obtaining a preliminary channel impulse response function $h_{prel}$ based on a classical processing (e.g. LSE based processing or double correlation based processing), which classical processing relies on evaluation of the received signals y and the training sequence TR_SEQ. A second unit thereof is a second estimation unit 4b as a variance estimation unit. To both units, the first unit 4a and the second unit 4b, the received signals y and the training sequence TR_SEQ are input.

The variance estimation unit 4b derives the noise variance value $\delta^2$ based on the preliminary channel impulse response function parameters $h_{prel}$ supplied thereto from the first unit 4a. The noise variance value $\delta^2$ is supplied to the LMMSE channel impulse response estimation means 2.

Based on the estimated preliminary channel impulse response function $h_{prel}$, also the channel covariance matrix $C_{hh}$ can be determined by the first unit 4a and the respective values thereof are supplied to the LMMSE estimation means 2. The first unit 4a is thus adapted to perform an operation expressed by equation (6) above.

The LMMSE estimation means 2 then obtains the channel impulse response function h on the basis of the supplied signals y, the training sequence TR_SEQ (or symbol sequence matrix X, respectively) and the supplied parameters $\delta^2$ and $C_{hh}$ obtained as outputs of the pre-processing unit 4.

Figure 2:
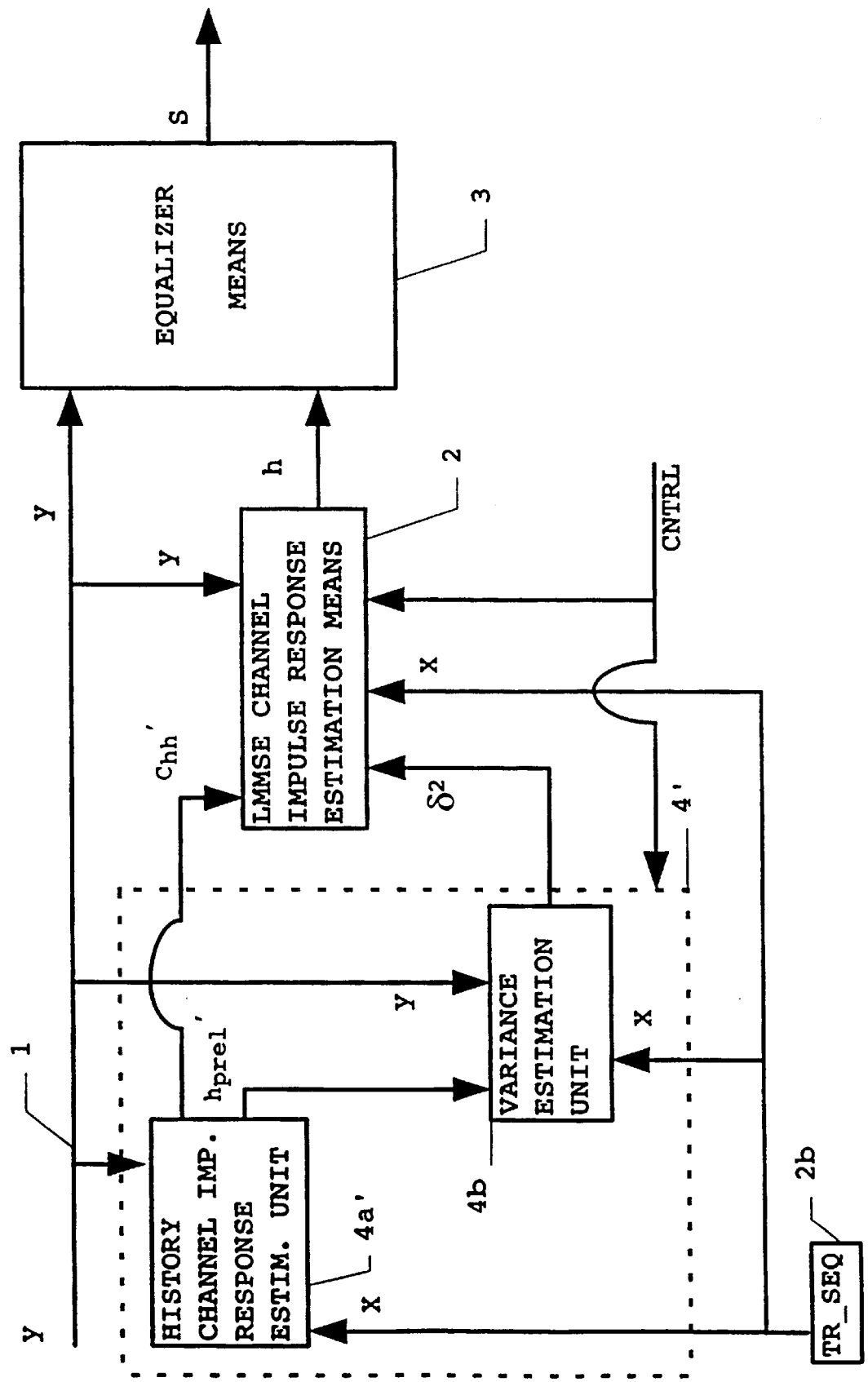
FIG. 2 shows a modification of the first embodiment depicted in FIG. 1.

FIG. 2 shows a modification of the first-embodiment according to the invention. The circuit structure is substantially identical to the one adopted by the first embodiment, so that only the differences there between will be described herein after.

The difference between the first and second embodiment resides in that a modified pre-processing means 4' is provided. The modification manifests in a modified first estimation unit 4a'. The modified first estimation unit 4a' is adapted to estimate a preliminary channel impulse response function $h_{prel'}$ and a covariance matrix $C_{hh'}$ of the channel impulse response function using history information of the channel impulse response function. The modified first estimation unit 4a' is preferably adapted to use history information and/or to be operated as described in same applicants and same inventors' international patent application titled "A method for modifying the channel impulse response in TDMA systems" filed simultaneously with the present application, as described herein after with reference to FIGS. 2A to 2D. (However, other concepts as described above in connection with the second approach are also conceivable.)

Embodiments of the device using history information as used in the modification are now described in detail with reference to the drawings (FIGS. 2A to 2D). According to previous solutions, an estimated channel impulse response function is modified using information contained in the received data stream, i.e. contained in bursts received during time slots of TDMA frames.

In contrast, the present device using history information proposes to use not only such received burst information, but to additionally use a knowledge of previous (past) channel impulse response functions and to additionally use such history information to modify an estimated channel impulse response function.

The above basic idea of the device using history information is described herein below in greater detail. In this connection, the following definitions/assumptions are made.

The behavior of a transmission channel 1 is represented by a model of the channel which assumes a channel to have a certain number of multi-path components. (In the above given example of a base station BS receiving signals s(t) and s(t+T) originating from a mobile station MS, a two-path channel is assumed). For such a channel model, an impulse response function h is determined or estimated, which may be represented as a vector of n components, the number of components being dependent on the number of modeled multi-path components of the channel, and each component can be represented as a complex value having a real and imaginary part. Therefore, if not mentioned otherwise, all subsequently mentioned signals may be assumed to be n-component vector signals in complex representation. Indices k−1, k, etc. represent a mutual time relation between signals. For example, if a current signal is denoted by index (k), a previous signal is denoted by index (k−1).

In the following, the principles of the method according to the present invention are described.

The physical parameters on which the history information can be based are the phase and/or the amplitude of the multi-path channel components. These physical parameters are correspondingly represented by the coefficients of the impulse response function h.

The phase of such multi-path channel components varies rather rapidly. The phase may thus be analyzed to obtain short-term history information concerning the channel impulse responses function. The amplitude of such multi-path channel components varies rather slowly. The amplitude may thus be analyzed to obtain long-term history information concerning the channel impulse response function.

Firstly, an estimated channel impulse response function $h_k$ is estimated at a first time. As is well known, the estimation of an estimated channel impulse response function, in a TDMA system, is based on the detection of a known predetermined training sequence TR_SEQ transmitted at predetermined times as a burst in time slots of a TDMA frame.

Subsequently, based on the estimated channel impulse function $h_k$ and at least one previous history information $win_{k-1}$, new history information $win_k$ is derived. Deriving such new history information $win_k$ may be achieved based on the following relationship:

$$win_k = a*(|Re\{h_k\}|^2 + |Im\{h_k\}|^2 + win_{k-1}) \quad (8)$$

wherein $win_k$ is the new history information, $win_{k-1}$ is the previous history information, a is a predetermined coefficient, $|Re\{h_k\}|^2$ being the square value of the absolute value of the real part of the current impulse response function $h_k$ in complex representation, and $|Im\{h_k\}|^2$ being the square value of the absolute value of the imaginary part of current impulse response function $h_k$ in complex representation, with the sum of $|Re\{h_k\}|^2 + |Im\{h_k\}|^2$ being representative of the square value of the amplitude of the impulse response function $|h_k|^2$. The above relation (1) is evaluated for each vector component i (1<=i<=n) of the impulse response function.

The coefficient a is a factor for scaling or weighting and indicates the extent to which the history information affects the modification of a currently to be modified channel impulse response function h. The coefficient a is set to a value of less than 1 (a<1), for example to a value of 0.25.

Assuming that the method is started to be carried out upon establishing the channel 1 and a very first estimation of the channel impulse response function h is effected, a history information wino should be set to a value of zero since no history is yet available.

Then, based on equation (7), subsequent history information $win_k$ is as follows:

$$win_1 = a*(|h_1|^2 + win_0) = a*|h_1|^2$$
$$win_2 = a*(|h_2|^2 + win_1) = a*|h_2|^2 + a^2*|h_1|^2 \quad (9)$$
$$win_3 = a*(|h_3|^2 + win_2) = a*|h_3|^2 + a^2*|h_2|^2 + a^3*|h1|^2$$

By setting the coefficient a to a value less than 1 it is assured that the influence of the history information gets the smaller the older the history information is. This influence can be further and more quickly reduced when, for example, performing a scaling/weighting with a factor $a^2$, or $a^3$, etc. (a<1) or some other appropriate functional relationship.

Based on the thus derived current history information win, modifying information mwin can be calculated as follows, for each respective vector component:

$$mwin_{i;k} = win_{i;k}/MAX(win_k) \quad (10)$$

with $mwin_{i;k}$ being the i-th vector component of modifying information mwin at a time $t_k$, $win_{i;k}$ being the the i-th vector component of the history information win at the time $t_k$, and $MAX(win_k)$ representing the maximum value of all vector components i (1<=i<=n) of the history-information $win_k$ at the time $t_k$. (Other relations for calculating modifying information are also conceivable.)

A thus obtained modification factor mwin remains between zero and one for each vector component of the impulse response function.

Based on thus obtained modifying information, the estimated channel impulse response function h is then modified, for example as indicated below, for each i-th vector component:

$$hm_{i;k} = h_{i;k} * mwin_{i;k} \quad (11)$$
$$= (Re\{h_{i;k}\} + Im\{h_{i;k}\}) * mwin_{i;k}$$
$$= Re\{h_{i;k}\} * mwin_{i;k} + Im\{h_{i;k}\} * mwin_{i;k}$$

It has to be noted that a currently estimated channel impulse response function $h_k$ is modified using modifying information $mwin_k$ which is based on history information $win_{k-1}$ of the previously estimated channel impulse response function $h_{k-1}$ and on the current channel impulse response function $h_k$, thereby obtaining a modified channel impulse response function $hm_k$.

This modified channel impulse response function is then supplied as the signal hprel' to the variance estimation unit 4b and used to derive (not shown) the matrix $C_{hh'}$ supplied to the LMMSE channel impulse response estimation means 2.

A device adapted to implement the above described method is described below with reference to the drawings.

Figure 2A:
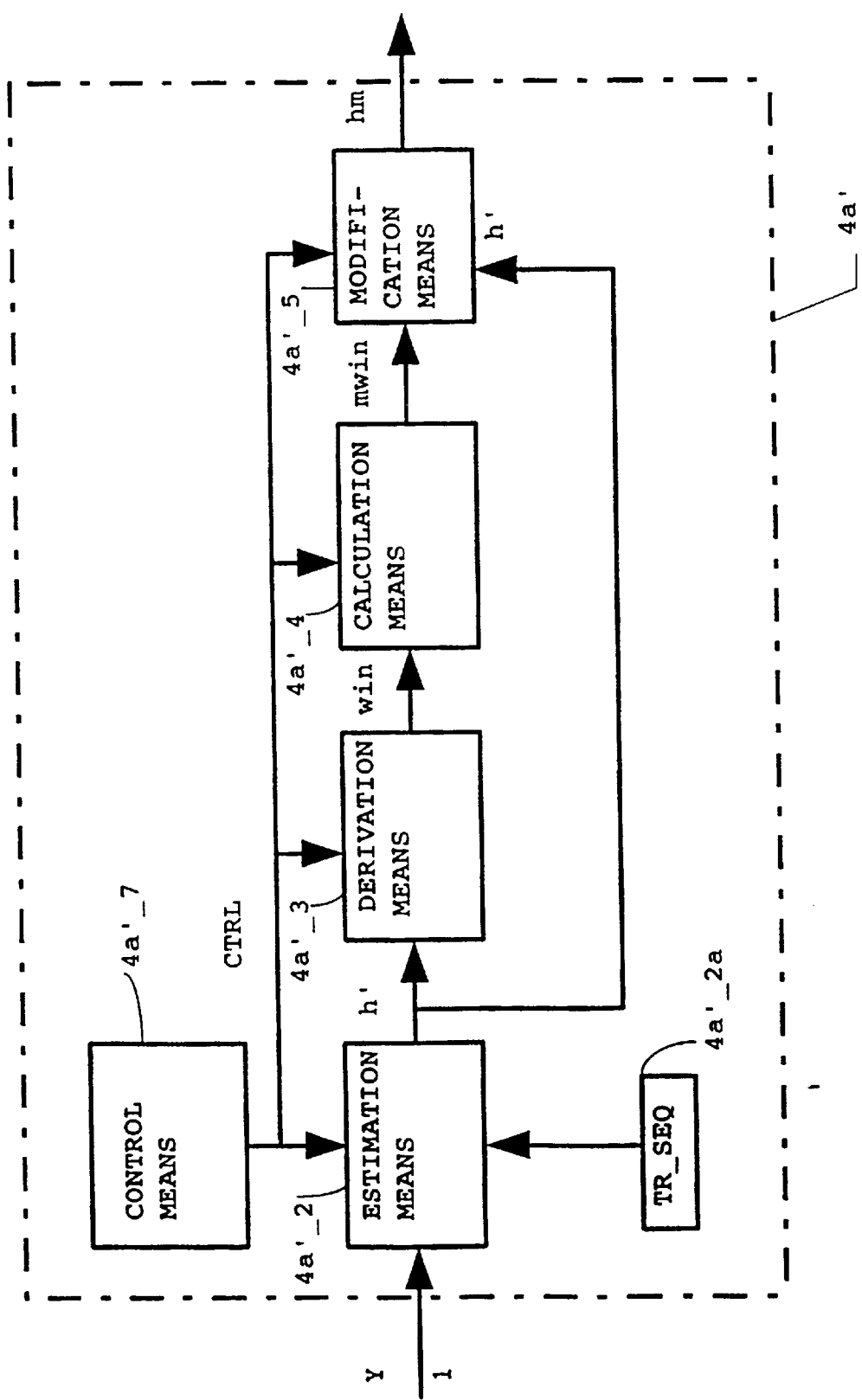
FIG. 2A shows a basic block circuit diagram of a device using history information used in the modification.

FIG. 2A shows a basic block circuit diagram of a device using history information (numeral 4a' in FIG. 2). From a sending (transmitting device) like for example a mobile station MS (not shown) initially transmitted signals y' are transmitted. The initially transmitted signals y' are transmitted via a transmission channel 1. The channel 1 may be regarded as the succession of, for example, D/A conversion means and coding/modulation means at the sending side, sending antenna means, air interface, receiving antenna means, A/D-conversion means at the receiving side, like for example at a base station BS. The channel 1 is a multi-path channel, and the initially transmitted signals y' are received as a (distorted) signal y to be equalized.

The received signal y is supplied to an estimation means 4a'_2. The estimation means 4a'_2 estimates an estimated channel impulse response function h'. The estimation processing is based on only a part of the received signal y, namely the known training sequence TR_SEQ, which is for example stored in a training sequence storing means 4a'_2a and used by the estimation means. The training sequence TR_SEQ is only transmitted at predetermined times in the stream of data. Therefore, a control means 4a'_7 controls the entire operation of the device by means of a timing control signal CTRL. The control means 4a'_7 renders the device operative in cycles, which correspond to the times, during which the training sequence TR_SEQ is transmitted as a burst in time slots of TDMA frames.

The control signal CTRL is thus applied to the estimation means 4a'_2 as well as to a derivation means 4a'_3, a calculation means 4a'_4 and a modification means 4a'_5 to be described later.

The estimated channel impulse response function h' is represented by a vector signal, with the vector signals representing the respective coefficient values of the impulse response function. The corresponding vector signal (hereinafter also referred to as "the function") is supplied to the derivation means 4a'_3 and also to the modification means 4a'_5.

Based on the vector signal which represents the estimated channel impulse response function h', the derivation means 4a'_3 derives history information win representative of the history of the channel impulse response function h', i.e. taking into account past (previous) parameters of the respective channel impulse response function. These previous parameters are thus representative of changes in the conditions of the transmission channel. Each time the estimation means 4a'_2 estimates a channel impulse response function $h_{k'}$, the history information $win_k$ is updated by the derivation means $4a'\_3$. The derivation means $4a'\_3$ always keeps a record of at least the latest history information $win_{k-1}$.

Based on the respective updated history information $win_k$, the calculation means $4a'\_4$ calculates a modifying information $mwin_k$. The modifying information $mwin_k$ is supplied as a control signal to the modification means $4a'\_5$ to modify the vector signal representing the currently estimated channel impulse response function $h_{k'}$.

That is, although there is a certain, but negligible, delay in the processing by the derivation means $4a'\_3$ and the calculation means $4a'\_4$, the modification means $4a'\_5$ modifies a currently estimated channel impulse response function $h_{k'}$ which is based on the currently received signal y using the currently calculated modifying information $mwin_k$.

A vector signal representing a modified channel impulse response function hm is then output from the modification means $4a'\_5$ and supplied as the signal hprel' to the variance estimation unit $4b$ (in FIG. 2) and used to derive (not shown) the matrix $C_{hh'}$ supplied to the LMMSE channel impulse response estimation means 2 (also shown in FIG. 2).

Figure 2B:
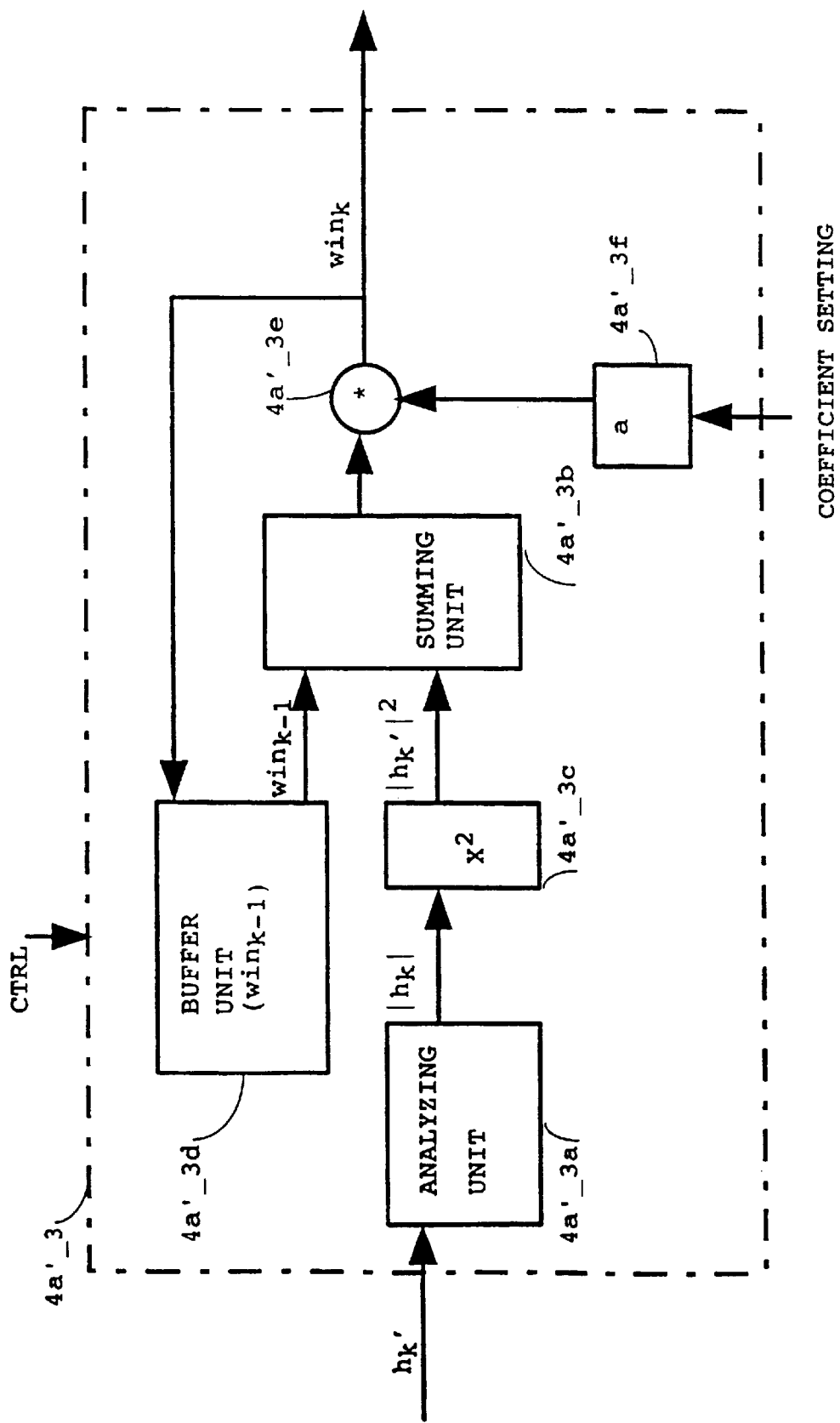
FIG. 2B shows details concerning the implementation of a derivation means in form of a block circuit diagram.

FIG. 2B shows details concerning the implementation of the derivation means $4a'\_3$ in form of a block circuit diagram.

The signal representing the currently estimated channel impulse response function $h_{k'}$ is supplied as a vector signal of n components to the derivation means $4a'\_3$.

The derivation means comprises an analyzing unit $4a'\_3a$ which analyzes the vector signal and obtains an analysis result which reflects physical parameters and their time variation of the channel. For example only, the derivation means $4a'\_3$ as shown on FIG. 2B bases the derivation of history information $win_k$ on the amplitude of the multi-path channel components, which are represented by the magnitude of the channel impulse response function signal $|h_{k'}|$. The magnitude signal $|h_{k'}|$ of each respective vector signal component i is then supplied to a squaring unit $4a'\_3c$ which obtains the square value $|h_{k'}|^2$ thereof.

The signal representing a respective square value is supplied to a first input terminal of a summing unit $4a'\_3b$. To an other input terminal of the summing unit $4a'\_3b$, a previous history information signal $win_{k-1}$ is supplied. A record of a respective previous history information signal is kept in a buffer unit $4a'\_3d$ which temporarily stores the respective previous history information signal $win_{k-1}$. It is to be noted that a value of zero can be stored in the buffer unit as a start value of history information upon initialization of the device, as mentioned above.

The output signal of the summing unit is supplied to a first weighting unit $4a'\_3e$. This first weighting unit $4a'\_3e$ weights and/or scales the summing unit output signal with a predetermined coefficient a. The coefficient a can be set by a coefficient setting unit $4a'\_3f$ to a desired value, which should be smaller than 1.

The weighted signal $win_k$ output by the first weighting unit $4a'\_3e$ is fed back to the buffer unit $4a'\_3d$ to be retained therein as a record of the history information which is to be used in a subsequent processing cycle.

The signal $win_k$ is also output from the derivation means as a history information vector signal of n components and supplied to the calculation means $4a'\_4$.

Figure 2C:
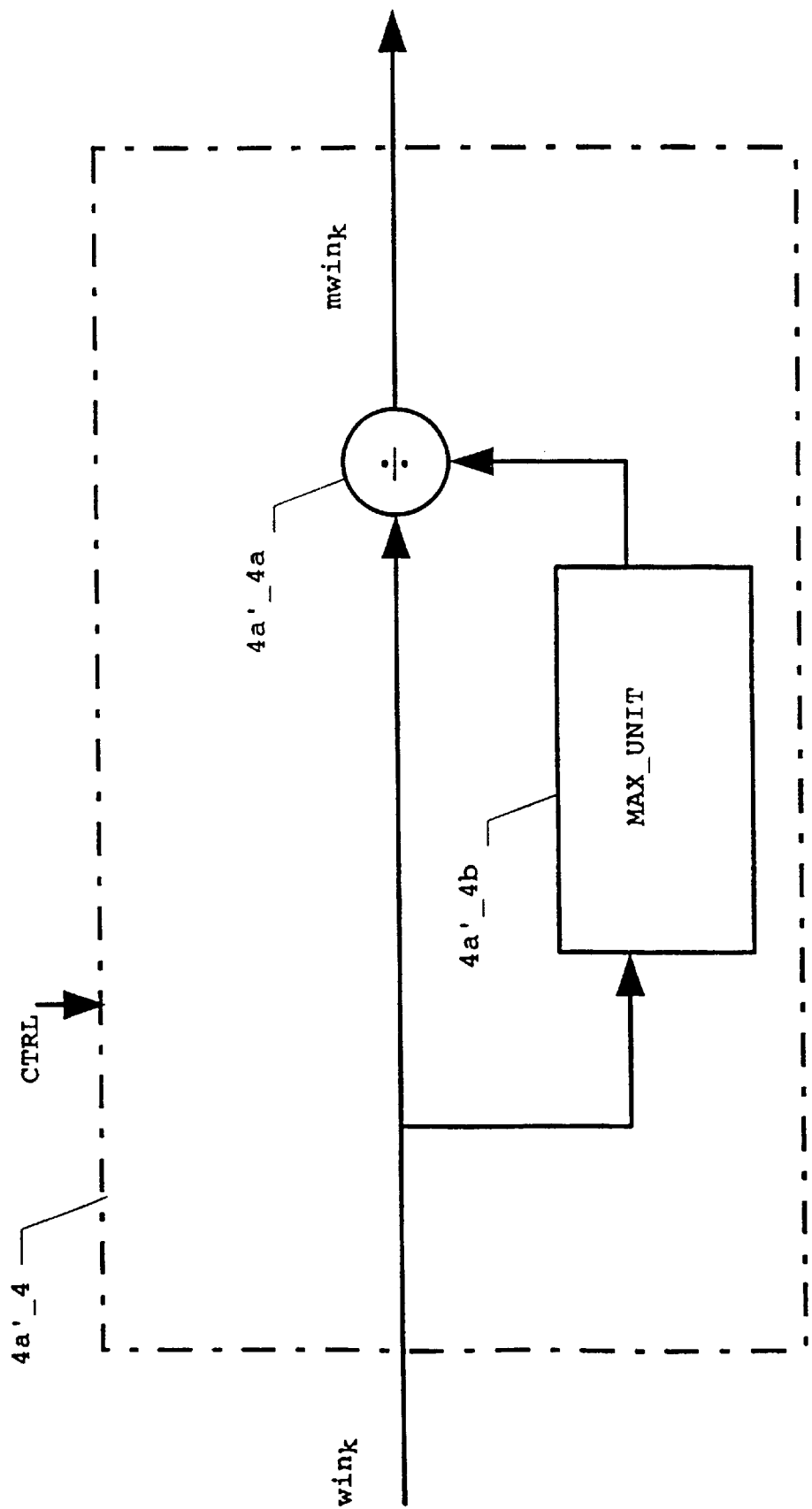
FIG. 2C shows details concerning the implementation of a calculation means in form of a block circuit diagram.

FIG. 2C shows details concerning the implementation of the calculation means $4a'\_4$ in form of a block circuit diagram The history information signal $win_k$ which is output from the derivation means $4a'\_3$ is supplied to a second weighting unit $4a'\_4a$ forming part of the calculation means $4a'\_4$. The history information signal $win_k$ is branched within the calculation means $4a'\_4$ to be supplied to a maximum determination unit $4a'\_4b$ as another part of the calculation means $4a'\_4$. The maximum determination unit $4a'\_4b$ is adapted to output a signal corresponding to the one of the vector component signals $win_{i;k}$ of the history information vector signal $win_k$ having the maximum value among all currently supplied vector component signals. Each respective vector component signal $win_{i;k}$ is then weighted by means of said second weighting unit $4a'\_4a$ in that it is subjected to a division by said maximum value signal. The weighted signal output from the second weighting unit $4a'\_4a$ is output as a modifying information signal $mwin_k$ to the modification means $4a'\_5$.

The modification means $4a'\_5$ may be realized as a simple multiplication means which multiplies each component i of the signal h' representing the channel impulse response function with the respective component i of the modifying information signal mwin, thereby outputting a vector signal representing the modified channel impulse response function hm which is supplied as the signal hprel' to the variance estimation unit $4b$ (FIG. 2) and used to derive (not shown) the matrix $C_{hh'}$ supplied to the LMMSE channel impulse response estimation means 2 (FIG. 2).

As mentioned above, the present device using history information may advantageously be combined with other concepts for modifying a channel impulse response.

Figure 2D:
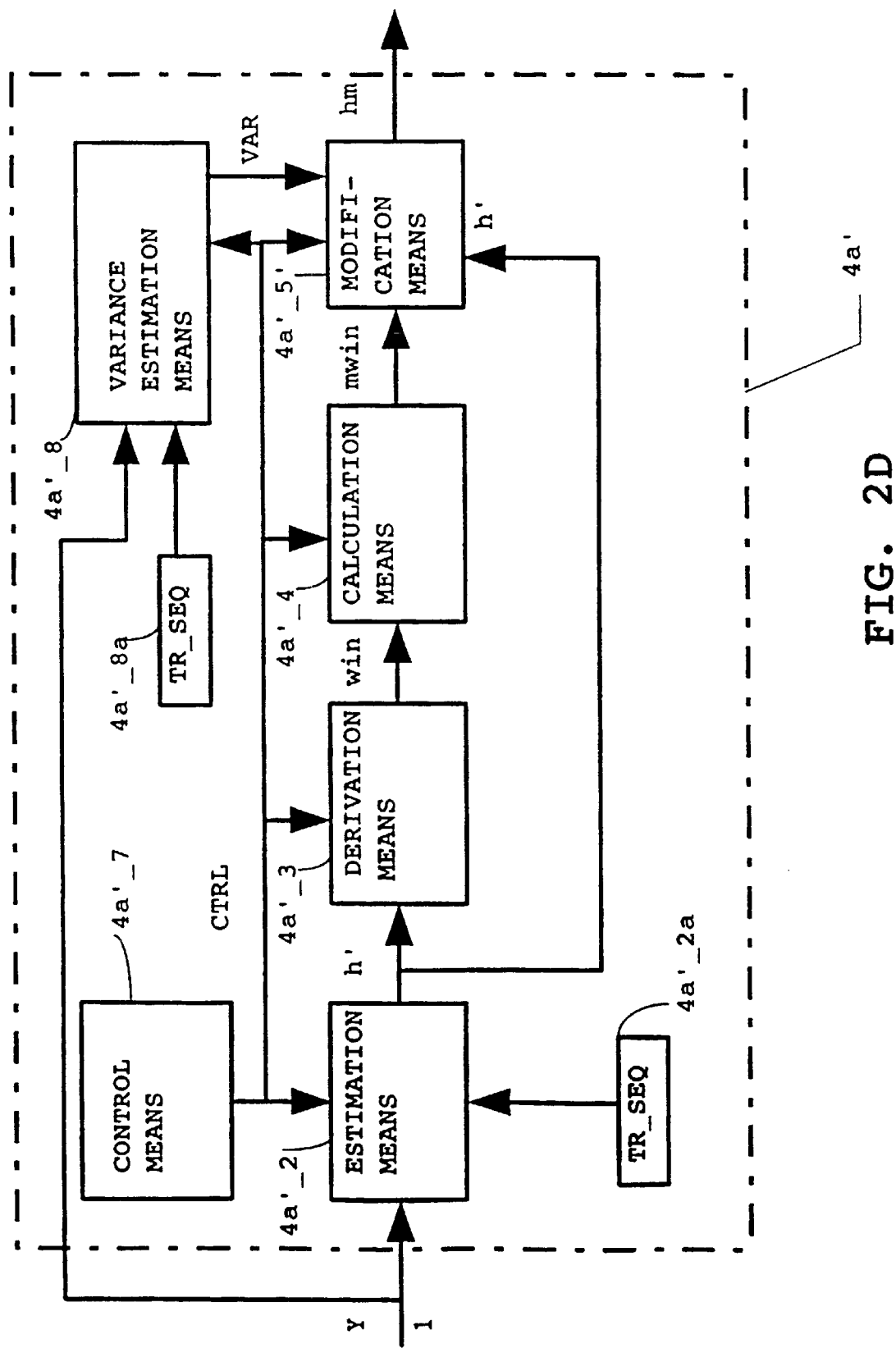
FIG. 2D shows the basic block diagram of the device using history information used in the modification when combined with other structures for channel impulse response function improvements, as for example proposed in the recently filed international application number PCT/EP98/04562.

FIG. 2D shows the basic block diagram of the present device using history information when combined with a structure for modification of channel impulse response function, as for example proposed in the recently filed international application number PCT/EP98/04562 of the present applicant.

The structure is substantially similar to the one depicted in FIG. 2A. The differences are as follows.

A variance estimation means $4a'\_8$ (also controlled by the signal CTRL) and an associated training sequence storing means $4a'\_8a$ are additionally provided. (However, the storing means $4a'\_8a$ may be identical to the storing means $2a$ explained above. Additionally, both of these storing means may be identical to the storing means $2b$ depicted in FIG. 2. Furthermore, control signals CTRL may originate from a single control means or control unit only.) The variance estimation means $4a'\_8$ is adapted to operate according to the method as proposed in the application PCT/EP98/04562 and outputs a control signal VAR supplied to a modification means $4a'\_5'$. For further details concerning the operation of the variance estimation means 8 the reader is referred to the application PCT/EP98/04562 which is incorporated herein by reference.

The modification means $4a'\_5'$ depicted in FIG. 2D is adapted to modify the signal representing the channel impulse response function h' based on two control signals, i.e. mwin obtained as described herein above and VAR to be obtained as described in the above mentioned previous application PCT/EP98/04562.

Furthermore, another modification (not shown in the figures) is conceivable. According to such a further modification, the variance estimation could be performed after channel impulse response modification according to the present invention. This means, that one input terminal of the means $4a'\_8$ is to be connected the output of the modification means $4a'\_5$ (of FIG. 2a), thereby being supplied with the signal hm, and the control signal VAR is to be connected to a further modification means operated according to the principles as set out in said previous application, to thereby output a "modified modified" channel impulse response signal (two-stage or cascaded modification) to be supplied as the signal hprel' to the variance estimation unit 4b (FIG. 2) and to be used to derive the matrix $C_{hh'}$ supplied to the LMMSE channel impulse response estimation means 2 (FIG. 2).

According to an above discussed variation (not shown) of the first and second approaches, the channel impulse response estimation units 4a, 4a' of the pre-processing means 4, 4', respectively, may also be adapted to provide as an additional output a time of arrival TOA information. The TOA information can also be supplied to the LMMSE estimation means 2 in order to reduce the required matrix size by selecting a less complex channel model, so that the processing speed can be increased. Since the principles of this operation were set out above in detail, a repetition thereof is omitted here.

Figure 3:
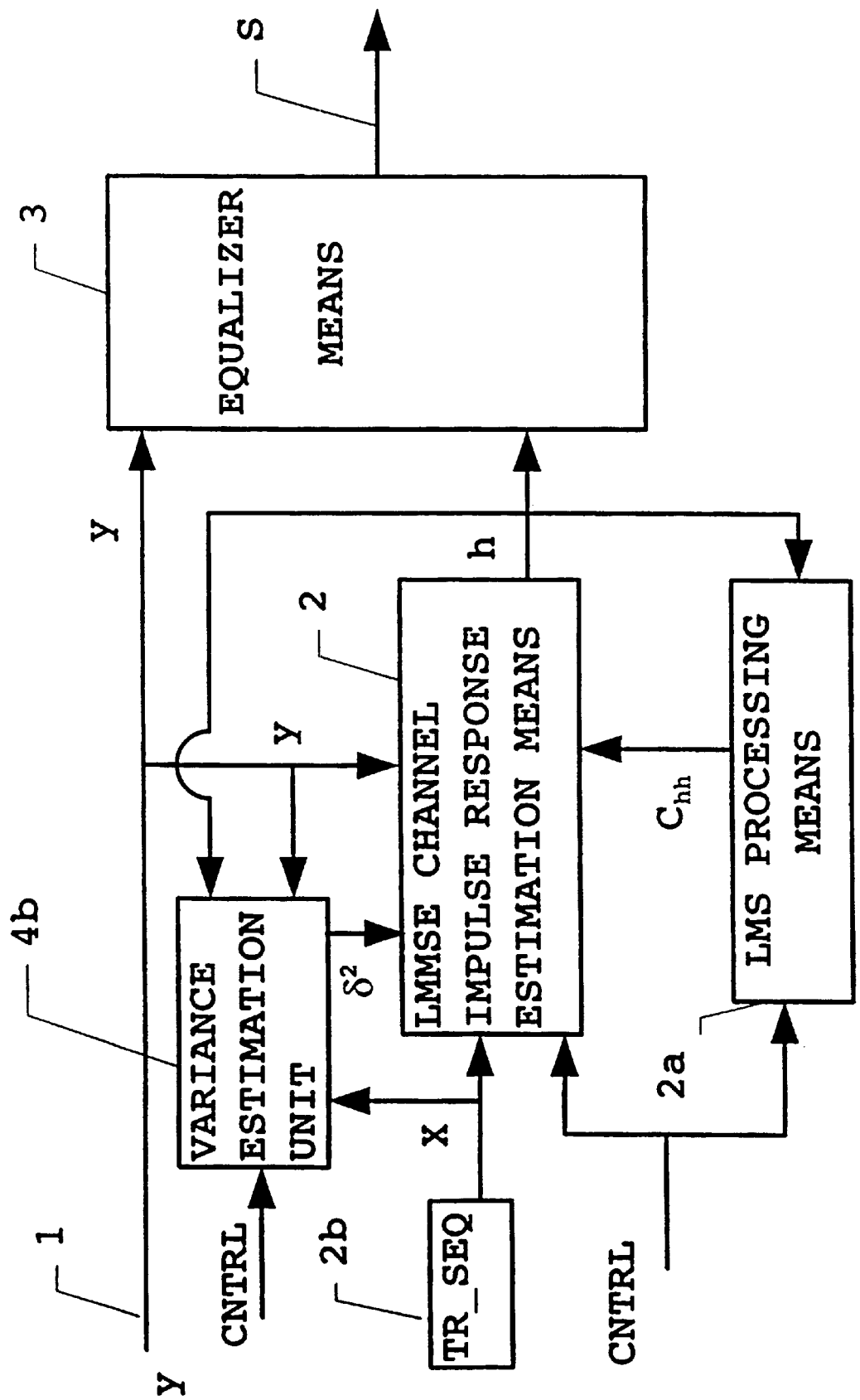
FIG. 3 shows a second embodiment of a device according to the present invention.

FIG. 3 illustrates a second embodiment of the present invention. The same components as explained herein above in connection with the first and second embodiments bear the same reference numerals and a detailed description thereof is therefore omitted.

The main difference between the second and the previous embodiments resides in the fact that the pre-processing means 4 as such can be significantly simplified, such that the required circuitry is reduced. In particular, the parameters $C_{hh}$ representing the channel impulse response covariance matrix are obtained based on an adaptive/iterative processing of the channel impulse response function h output by the LMMSE channel impulse response estimation means 2 itself. Namely, as shown in FIG. 3, the output of the LMMSE channel impulse response estimation means 2 is not only supplied to the equalizer means 3, but also fed back to the LMMSE channel impulse response estimation means 2 via, for example, an LMS estimation means 2a (LMS= least means square) which is adapted to derive the parameters $C_{hh}$ based on a LMS processing. Thereby, history information, i.e. information from previous bursts, is used to update the parameters $C_{hh}$ used for operating the LMMSE channel impulse response estimation means 2. This approach is feasible since it may safely be assumed that the parameters of the $C_{hh}$ matrix do not change significantly from time slot to time slot of a TDMA frame.

The parameters $\delta^2$ to be supplied to the LMMSE estimation means 2 are derived from a variation estimation unit 4b (similar to the one depicted in FIGS. 1 and 2 and controlled by a control signal CTRL), to which the currently received signals y and the symbol sequence matrix X are supplied. Moreover, as the channel impulse response function h, the output of the LMMSE estimation means 2 is fed back to the variation estimation unit 4b, as shown in FIG. 3.

It should be understood that the above description and accompanying figures are only intended to illustrate the present invention by way of example only. The preferred embodiments of the present invention may thus vary within the scope of the attached claims.

What is claimed is:

1. A method for processing received signals having been transmitted via a transmission channel, the method comprising the step of:
    subjecting said received signals to an estimation of a channel impulse response function of said transmission channel,
    wherein said estimation is based on a Linear-Minimum-Square-Mean-Error-processing using a training sequence transmitted together with received samples contained in said received signals,
    wherein said estimation is further based on a noise and interference energy estimate represented by a noise variance value as well as an impulse response energy distribution estimate represented by an estimated parameter covariance matrix for said transmission channel, and
    wherein said estimation of said channel impulse response function (h) is based on a simplified LMMSE estimation according to the equation $$h=(\delta^2 C_{hh}^{-1}+X^H X)^{-1} X^H y$$

wherein
    h denotes the channel impulse response function in vector representation,
    $\delta^2$ denotes the noise variance value of a starting point linear model,
    $C_{hh}$ is the estimated parameter covariance matrix,
    X is a symbol sequence matrix containing information regarding the training sequence,
    y denotes the received signal in vector representation,
    wherein an operator "$^{-1}$" denotes a respective inverse matrix (such that for a matrix M a relation $M*M^{-1}=E$ is satisfied, with E representing a unit matrix), and an operator "$^H$" denotes a complex conjugate transposition of a matrix.

2. A method according to claim 1, wherein the noise variance value and the estimated parameter covariance matrix values are obtained on the basis of results of a pre-processing of the received signals.

3. A method according to claim 2, wherein the pre-processing comprises a step of estimating a preliminary channel impulse response function.

4. A method according to claim 3, wherein pre-processing further comprises a step of estimating the noise variance value of the signal based on the estimated preliminary channel impulse response function.

5. A method according to claim 2, wherein the estimated parameter covariance matrix is obtained from a preliminary estimated channel impulse response function according to the following relation:

$$\begin{pmatrix} 1/(h_0 * h_0) & 0 & \ldots & 0 \\ \ldots & 1/(h_1 * h_1) & \ldots & 0 \\ \ldots & \ldots & \ldots & \ldots \\ 0 & 0 & \ldots & 1/(h_i * h_i) \end{pmatrix}$$

with $h_0, h_1, \ldots h_i$ being the respective vector components of the preliminary channel impulse response in complex notation, and suffix "*" denotes the conjugate complex value of a respective vector component.

6. A method according to claim 3, wherein the estimated parameter covariance matrix is estimated using history information of the preliminary channel impulse response function, thereby being based on several channel impulse response functions from several bursts.

7. A method according to claim 2, wherein said pre-processing estimates a time of arrival information for the received signals.

8. A signal processing device for processing received signals having been transmitted via a transmission channel comprising an estimated means,
    wherein said received signals are supplied to the estimation means adapted to estimated a channel impulse response function of said transmission channel, wherein said estimation means being adapted to perform a Linear-Minimum-Mean-Square-Error-processing based on a training sequence transmitted together with received samples contained in said received signals, wherein said estimation means is adapted to further perform said processing based on a noise and interference energy estimate represented by a noise variance value as well as an impulse response energy distribution estimate represented by an estimated parameter covariance matrix for said transmission channel, wherein said estimation means for estimating said channel impulse response function is adapted to perform a simplified LMMSE estimation according to the equation $$h = (\delta^2 C_{hh}^{-1} + X^H X)^{-1} X^H y$$

wherein h denotes the channel impulse response function in vector representation, $\delta^2$ denotes the noise variance value of a starting point linear model, $C_{hh}$ is the estimated parameter covariance matrix, X is the symbol sequence matrix containing information regarding the training sequence, y denotes the received signal in vector representation, wherein an operator "$^{-1}$" denotes a respective inverse matrix (such that for a matrix M a relation $M*M^{-1}=E$ is satisfied, with E representing a unit matrix), and an operator "$^H$" denotes a complex conjugate transposition of a matrix.

9. A device according to claim 8, further comprising pre-processing means adapted to pre-process the received signals and to provide outputs on the basis of which the noise variance value and the estimated parameter covariance matrix values are obtained.

10. A device according to claim 9, wherein said pre-processing means comprises a first estimation unit for estimating a preliminary channel impulse response function.

11. A device according to claim 10, wherein said pre-processing means further comprises a second estimation unit for estimating the noise variance value of the signal based on the estimated preliminary channel impulse response function.

12. A device according to claim 9, wherein the estimated parameter covariance matrix is obtained from a preliminary estimated channel impulse response function according to the following relation:

$$\begin{pmatrix} 1/h_0 * h_0 & 0 & \ldots & 0 \\ \ldots & 1/(h_1 * h_1) & \ldots & 0 \\ \ldots & \ldots & \ldots & \ldots \\ 0 & 0 & \ldots & 1/h_i * h_i \end{pmatrix}$$

with $h_0, h_1, \ldots h_i$ being the respective vector components of the preliminary channel impulse response in complex notation, and suffix "*" denotes the conjugate complex value of a respective vector component.

13. A device according to claim 10, wherein the estimated parameter covariance matrix is derived by a modified first estimation unit using history information of the preliminary channel impulse response function, thereby being based on several channel impulse response functions from several bursts.

14. A device according to claim 9, wherein said pre-processing means estimates a time of arrival information for the received signals.

* * * * *